US008176041B1

(12) United States Patent
Harinarayan et al.

(10) Patent No.: US 8,176,041 B1
(45) Date of Patent: May 8, 2012

(54) DELIVERING SEARCH RESULTS

(75) Inventors: Venky Harinarayan, Saratoga, CA (US); Wang Lam, San Jose, CA (US); Subramanyam Mallela, San Francisco, CA (US); Anand Rajaraman, Palo Alto, CA (US)

(73) Assignee: Kosmix Corporation, Mountain View, CA (US)

( * ) Notice: Subject to any disclaimer, the term of this patent is extended or adjusted under 35 U.S.C. 154(b) by 239 days.

(21) Appl. No.: 11/172,612

(22) Filed: Jun. 29, 2005

(51) Int. Cl.
*G06F 17/30* (2006.01)
(52) U.S. Cl. ....................... 707/722; 707/723
(58) Field of Classification Search ............... 707/3, 10
See application file for complete search history.

(56) References Cited

U.S. PATENT DOCUMENTS

| | | | | |
|---|---|---|---|---|
| 6,003,027 | A * | 12/1999 | Prager | 707/5 |
| 6,178,419 | B1 * | 1/2001 | Legh-Smith et al. | 707/6 |
| 7,133,870 | B1 * | 11/2006 | Tripp et al. | 707/10 |
| 7,243,102 | B1 * | 7/2007 | Naam et al. | 1/1 |
| 2001/0044720 | A1 * | 11/2001 | Lee et al. | 704/251 |
| 2005/0060311 | A1 * | 3/2005 | Tong et al. | 707/7 |
| 2005/0144162 | A1 * | 6/2005 | Liang | 707/3 |
| 2005/0251499 | A1 * | 11/2005 | Huang | 707/1 |
| 2008/0114755 | A1 * | 5/2008 | Wolters et al. | 707/5 |
| 2008/0243838 | A1 * | 10/2008 | Scott et al. | 707/5 |
| 2009/0112857 | A1 * | 4/2009 | Tong et al. | 707/5 |

OTHER PUBLICATIONS

U.S. Appl. No. 11/165,623, Rajaraman.
U.S. Appl. No. 60/644,323, Harinarayan.
U.S. Appl. No. 60/695,713, Rajaraman.
Borodin et al., Finding Authorities and Hubs From Link Structures on the World Wide Web, In Proceedings of the Tenth International World Wide Web Conference, Jan. 18, 2002.
Taher H. Haveliwala, Topic-Sensitive PageRank: A Context-Sensitive Ranking Algorithm for Web Search, In Proceedings of the Eleventh International World Wide Web Conference, 2002.
Jeh et al., Scaling Personalized Web Search, In Proceedings of the Twelfth International World Wide Web Conference, 2003.
Jon M. Kleinberg, Authoritative Sources in a Hyperlinked Environment, Journal of the ACM, 1999.
Lempel et al., The Stochastic Approach for Link-Structure Analysis (SALSA) and the TKC Effect, 2000.
Ng et al., Stable Algorithms for Link Analysis, In Proceedings the Twenty-Fourth Annual International ACM SIGIR Conference, 2001.
Page et al., The PageRank Citation Ranking: Bringing Order to the Web, 1998.
Richardson et al., The Intelligent Surfer: Probabilistic Combination of Link and Content Information in PageRank, 2002.
Soumen Chakrabarti, Mining the Web: Discovering Knowledge from Hypertext Data, 2002.

* cited by examiner

*Primary Examiner* — Baoquoc To
(74) *Attorney, Agent, or Firm* — Finnegan, Henderson, Farabow, Garrett & Dunner, LLP

(57) ABSTRACT

Delivering search results is disclosed. A search term is obtained and categories are determined. Results specific to each category are obtained and ranked based on a criterion that is specific to each category. The results are ranked based at least in part on a topic dependent score and may also be ranked in part on a topic independent score.

23 Claims, 11 Drawing Sheets

|  | Text Match Score | Topic 1 | Topic 2 | ... | Topic N | Total Doc. Goodness |
|---|---|---|---|---|---|---|
| Page 1 | 4 | 1 | 0 | ... | 0 | 5 |
| Page 2 | 2 |  |  | ... | 1 | 3 |
| Page 3 | 1 |  | 1 | ... |  | 2 |
| ... | ... | ... | ... | ... | ... | ... |
| Page p | 10 | 5 |  | ... |  | 15 |
|  |  | 22 | 3 | ... | 12 |  |

Fig. 5A

|  | Text Match Score | Family Doctor | Specialist | Women's Health | Kids | Dentistry |
|---|---|---|---|---|---|---|
| www.health.com/diabetes.html | 10 | 80 | 7 | 50 | 50 | 0 |
| mothertobe.com/diabetes.html | 9 | 50 | 10 | 90 | 75 | 0 |
| webmd.com/diabetes.html | 8 | 80 | 25 | 30 | 30 | 0 |
| cancer.org/pancreas.txt | 0 |  |  |  |  |  |
| medschool.stanford.edu/users/joe/glucose.pdf | 6 | 5 | 90 | 10 | 10 | 0 |
| med.harvard.edu/~bchavez/contraindications.txt | 3 | 10 | 90 | 20 | 20 | 2 |
| diabetes.org/cancer/breast_cancer.doc | 5 | 50 | 50 | 90 | 5 | 0 |
| dentalschool.edu/contact_us.html | 0 |  |  |  |  |  |
| women.com/TypeII/menopause.html | 6 | 60 | 60 | 95 | 5 | 0 |
| ... | ... | ... | ... | ... | ... | ... |
| ediet.org/precautions/sugar.html | 10 | 30 | 30 | 67 | 78 | 5 |
| health.com/cancer/ovarian/blood_tests.html | 6 | 50 | 10 | 88 | 2 | 0 |

Fig. 5B

DELIVERING SEARCH RESULTS

BACKGROUND OF THE INVENTION

Search engines, such as are used in conjunction with the Word Wide Web, are typically expected to search through vast amounts of data, yet return a manageable number of quality, relevant results. When attempting to determine which results are most relevant to a user, search engines generally evaluate prospective results for such factors as the number of occurrences of a search term and how close to the top of the document the search term occurs.

In some cases, the relevancy of a particular result may depend on the context of the query. For example, suppose that a user submits a query of "jaguar price." Typically, search engines do not differentiate results based on context and thus the same hits will be displayed to the user, irrespective of whether that user is interested in the car, the cat, or the operating system. There thus exists a continuing need to be able to provide relevant results in response to queries.

BRIEF SUMMARY OF THE INVENTION

Delivering search results is disclosed herein. A search term is obtained, for example, from a user who enters the search term into a form. A set of categories is determined. Categories may be obtained from a variety of sources, including human administrators, third party directory services, and by performing computations. Results specific to each category are obtained and ranked based on a criterion that is specific to each category. The results are ranked based at least in part on a topic dependent score and may also be ranked in part on a topic independent score.

BRIEF DESCRIPTION OF THE DRAWINGS

Various embodiments of the invention are disclosed in the following detailed description and the accompanying drawings.

FIG. 5A illustrates an embodiment of data used by a search server.

FIG. 5B illustrates an embodiment of data used by a search server.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
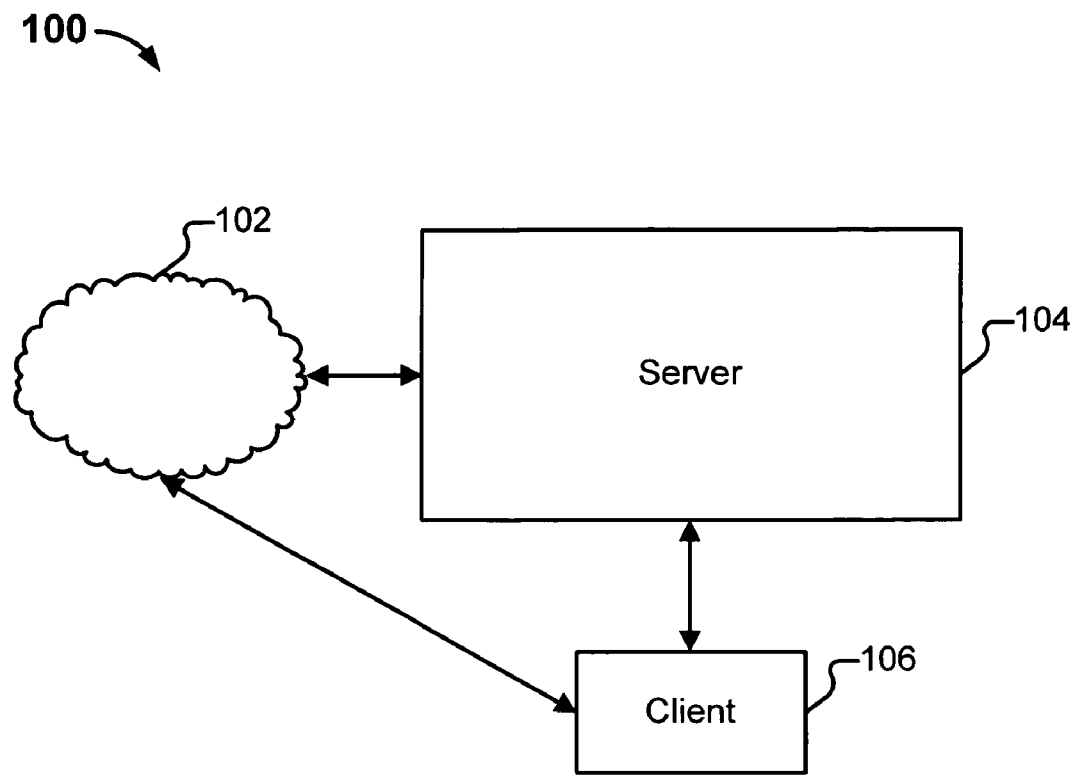
FIG. 1 illustrates an embodiment of a search system.

FIG. 1 illustrates an embodiment of a search system. In the example search system 100 shown, collection 102 is a group of World Wide Web pages, and is crawled and indexed by a search server 104. Client 106 submits queries to search server 104, and search server 104 returns results from collection 102. Hereinafter, when an operation is discussed as being performed on each document in collection 102, it should be understood that the operation may instead be performed on a subset of collection 102, as applicable. The documents in collection 102 are also referred to herein as "web nodes" and "web pages." In some embodiments, collection 102 includes documents found on an intranet. In some embodiments, collection 102 is a subset of the World Wide Web, or a subset of the documents found on an intranet, or a combination of such subsets. Documents found in collection 102 can include, but are not limited to text files, multimedia files, and other content. Search server 104 may be a single device, or its functionality may be provided by multiple devices.

As described more fully below, search server 104 assigns scores to the documents in collection 102. In some embodiments, the methods described in U.S. patent application Ser. No. 11/165,623, entitled DOUBLE ITERATIVE FLAVOR RANK (hereinafter "DIFR"), filed Jun. 22, 2005; U.S. Provisional Patent Application No. 60/644,323, entitled NATURAL RANDOM WALKS, filed Jan. 14, 2005; and U.S. Provisional Patent Application No. 60/695,713, entitled TOPIC RELEVANCE, filed Jun. 29, 2005, are used.

Figure 2:
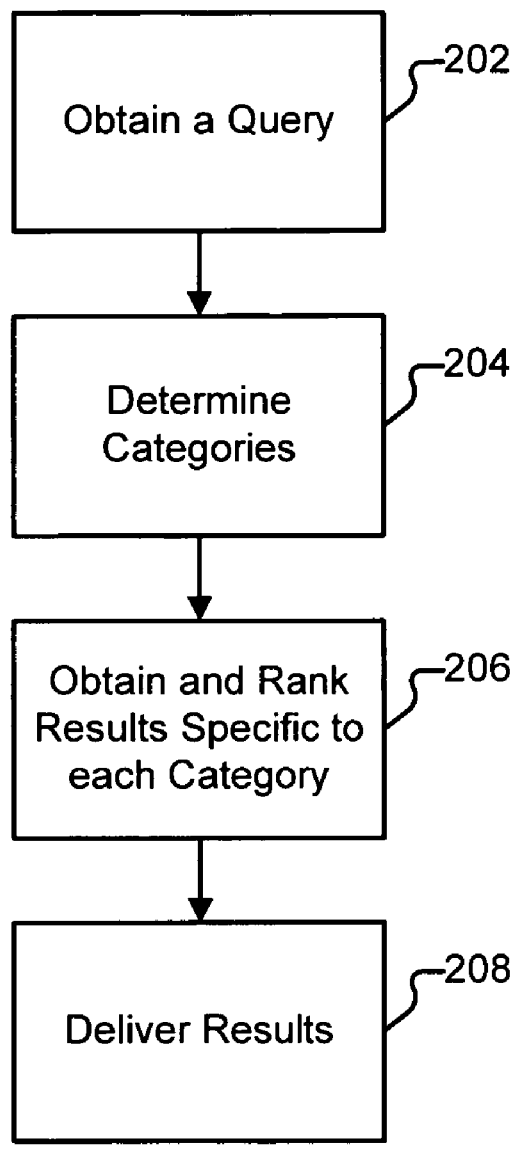
FIG. 2 illustrates an embodiment of a process for delivering a search result.

FIG. 2 illustrates an embodiment of a process for delivering a search result. The process, begins at 202 when a query is obtained. The query may be obtained in a variety of ways. For example, at 202, a user may enter a search term into a web form provided by server 104 to client 106, a personal computer with a web browser. Other clients may also be used as applicable, such as a handheld device (such as a PDA), or a mobile phone.

At 204, a set of categories is determined. As described more fully below, categories may be provided in various manners, such as by a human administrator. In some cases, categories may be obtained from a third party, such as the Open Directory Project. In some cases, categories may be computed. Hereinafter, broad, high-level categories, such as "Travel," "Health," and "Sports" are also referred to as "flavors."

A flavor can be defined in part through use of a seed set. For example, a Health flavor could be defined with an initial seed set of pages, such as webmd.com, mayoclinic.com, etc. In some embodiments, the seed sets are selected by a human and include pages that are considered to be useful or relevant to the topic associated with the flavor. For example, webmd.com provides a great deal of information on a variety of health topics. In some embodiments, the seed sets are created as least in part based on a directory service, such as the Open Directory Project. In some embodiments, DIFR or other ranking methods can be used to improve the seed set. The seed set associated with any particular flavor may be dynamic. For example, as better seeds for a topic are located, they may replace or join previously selected seeds.

In a conventional (unflavored) search, a web page is assigned a score, i.e. its link-score or Page Rank®, based on its context in a web graph. In a flavored (biased) search, web pages are assigned individual scores based on their relevance to an associated flavor and not just their context in the web graph.

At 206, results specific to each category are obtained and ranked. In some embodiments, flavored ranking is employed at 206. In that case, the obtained results (web pages) are individually ranked within each flavor (category) determined at 204. Depending on a variety of factors, such as available processing and storage resources, the processing performed at 206 may be performed on a subset of categories.

At 208, results are delivered to the user. As described more fully below, results may be presented to the user in a variety of ways.

Figure 3:
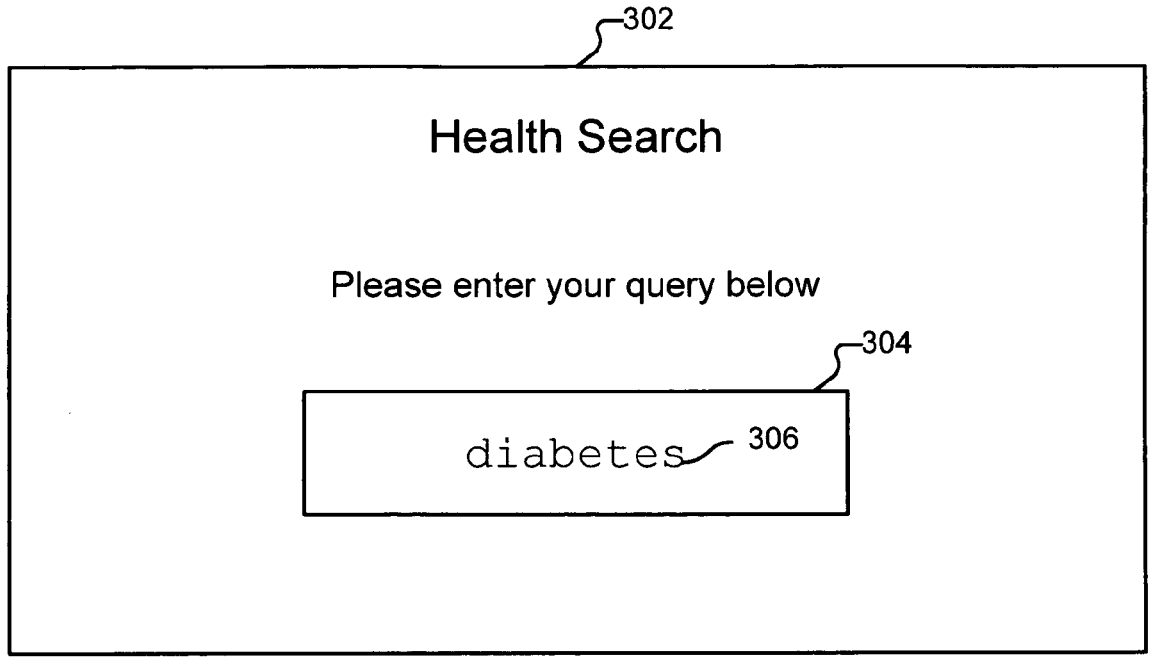
FIG. 3 illustrates an embodiment of an interface for obtaining a query.

FIG. 3 illustrates an embodiment of an interface for obtaining a query. The example shown in FIG. 3 could be an example of an implementation of the process performed at 202 in FIG. 2. In this example, a web page 302 includes a form 304 into which a user can submit a query 306. Here, web page 302 is a topic-specific portal, aimed at providing visitors with topic-specific information and tools. Specifically, server 104 has been customized to provide health flavored results. In some embodiments, other flavors are provided, such as travel. As discussed more fully below, search server 104 may also be configured to provide general results, across a wide variety of topics. In the example shown, the user has entered a query of "diabetes" (306).

Figure 4:
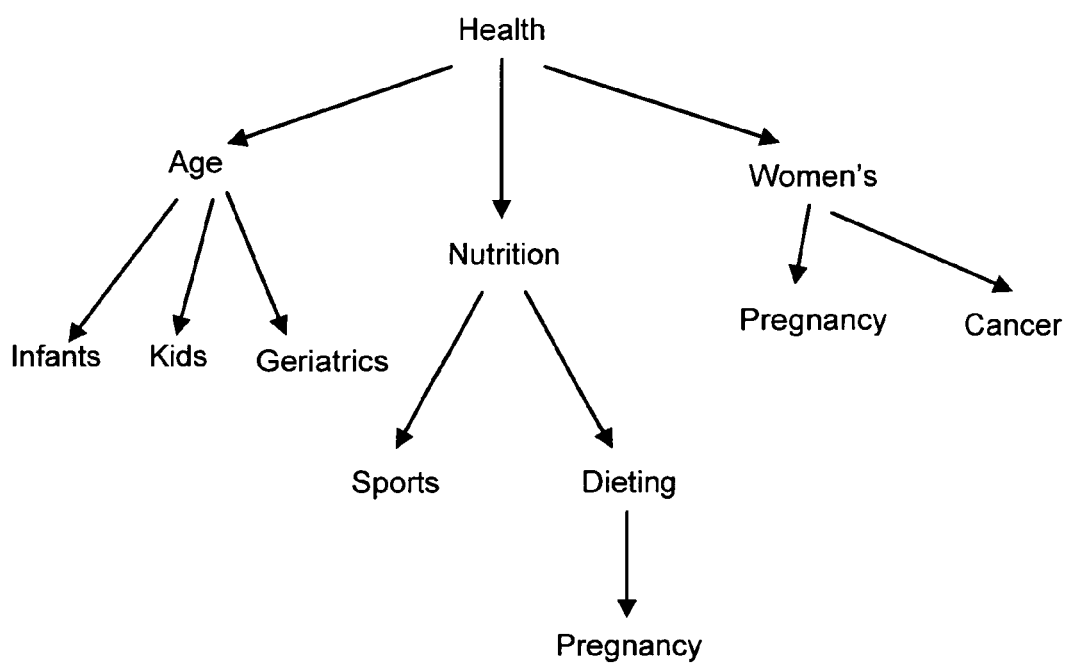
FIG. 4 illustrates a simplified example of a topic that has a hierarchy of subtopics.

FIG. 4 illustrates a simplified example of a topic that has a hierarchy of subtopics. A broad topic, or flavor, such as health, can be viewed as a collection of subtopics. For example, health information may be broadly classified according to subtopics such as aging, women's health, and nutrition. In practice, topics may be classified into many more subtopics. Within those subtopics, subsubtopics exist, such as infants and geriatrics within the subtopic of aging and pregnancy and cancer within the subtopic of women's health. These hierarchies can be used to perform more relevant searches, and to present results to users.

FIG. 5A illustrates an embodiment of data used by a search server. Matrix 500 is an abstraction of some of the data used by search server 104 and can be used in implementations of portion 206 of FIG. 2.

Conceptually, a matrix 500 is created for every search term. In practice, optimized routines and data structures may be used. For example, rather than storing the entire matrix in memory, which could be prohibitively large, portions of the matrix may be computed as necessary, and/or the matrix may be approximated as appropriate. The list of pages and list of topics may be uniform across each matrix. However, the cells are populated differently for different search terms.

As shown, each matrix 500 has along one axis the URLs of all documents in collection 102 (502). Cells are populated by search server 104 based on assorted scores applicable to a particular page. For example, for each page, a text match score (504) is calculated. The text match score is typically a topic-independent score. It generally evaluates a page based on such factors as the occurrences of the search term, the placement of those occurrences (such as whether they are concentrated at the top of a document), and the font size and color of the term as it appears in a document. Other topic independent scores may also be stored, such as the document's PageRank®.

Along the other axis are topics (506), such as the categories determined at 204 of the process depicted in FIG. 2. For each topic, topic dependent scores are calculated. For example, flavor ranks (such as DIFR scores) and topic relevance scores are calculated, relative to each page. In this example, the DIFR and topic relevance scores of each page relative to a topic are combined into a composite score for that topic. Other methods of assigning topic dependent scores to pages may be used, as appropriate.

Two types of "goodness" scores can be computed from a matrix. By summing the values down a column, a topic goodness score can be computed. A topic is generally good if many pages have a high score relative to that topic. In this example, Topic 1 has the highest topic goodness (508) and Topic 2 has the lowest topic goodness (510). One method of determining which topics are most relevant to a query is to sort the topic goodness scores of each topic, and select the highest ranking among them, such as the top 5 or top 10 topics. Other methods may also be used, such as setting a threshold at a particular value above which categories will be returned, irrespective of whether there are two or fifty.

A document's goodness relative to a particular topic can be computed by combining the document's topic independent score(s) with its topic dependent scores for that topic. In this example, the scores are combined through simple addition. Thus, Page 1 has a goodness score of 5, relative to Topic 1, and Page p has a goodness score of 15, relative to Topic 1. Other methods of combining scores may also be employed, such as by multiplying the scores or applying a more sophisticated equation.

By summing the values across a row, a document's total goodness score can be computed. A document may generally have a high total goodness score if it has a high goodness score relative to a few topics, or if it has a more modest goodness score relative to many topics. As described more fully below, documents with high total goodness score may be especially good "General" results.

The information in matrix 500 can be used both to determine which topics are most relevant to a query, and within those topics, to determine which pages are most relevant.

FIG. 5B illustrates an embodiment of data used by a search server. The example shown is an illustration of a matrix 512 which has been computed for the query "diabetes," submitted to health flavored portal 302. Pages 514 and 516 both have text match scores of 0, indicating that the term, "diabetes" does not occur in them. In this example, those pages do not "match" the query and thus will not be returned as results. In other cases, partial or fuzzy matches may nonetheless receive text match scores or otherwise be permissible results.

For each document with a nonzero text match score, topic dependent scores are calculated. This corresponds to a portion of the processing performed at 206 in FIG. 2. In some embodiments, the set of documents having a nonzero text match score is the results set. The same number of results will be presented to a user, irrespective of which topic they select. However, the ordering of the results set will vary based on the topic.

For each topic, topic goodness scores are computed and ranked. This corresponds to a portion of the processing performed at 206 in FIG. 2. In this example, the top five ranking topics are "Family Doctor," "Specialist," "Women's Health," and "Kids." "Dentistry" is considerably less relevant to diabetes than the other topics are.

Family Doctor documents are generally articles that lay people can understand, and feature fewer complex medical terms or concepts. In contrast, Specialist documents are generally more technical, and may include academic journal articles. Women's Health documents may feature subtopics including pregnancy, menopause, and breast cancer. Kids documents may include discussion of topics such as the effects of pharmaceutics on children.

Within each topic, document goodnesses relative to that topic are compared. This corresponds to a portion of the processing performed at 206 in FIG. 2. In this example, URL 530 is the highest ranked document relative to the Women's Health topic, and so on. The highest ranked document (522) in the Dentistry category is a page located on a dieting website that describes some of the health problems of eating too much sugar. The same page has a much higher document goodness relative to several of the other topics.

Figure 6:
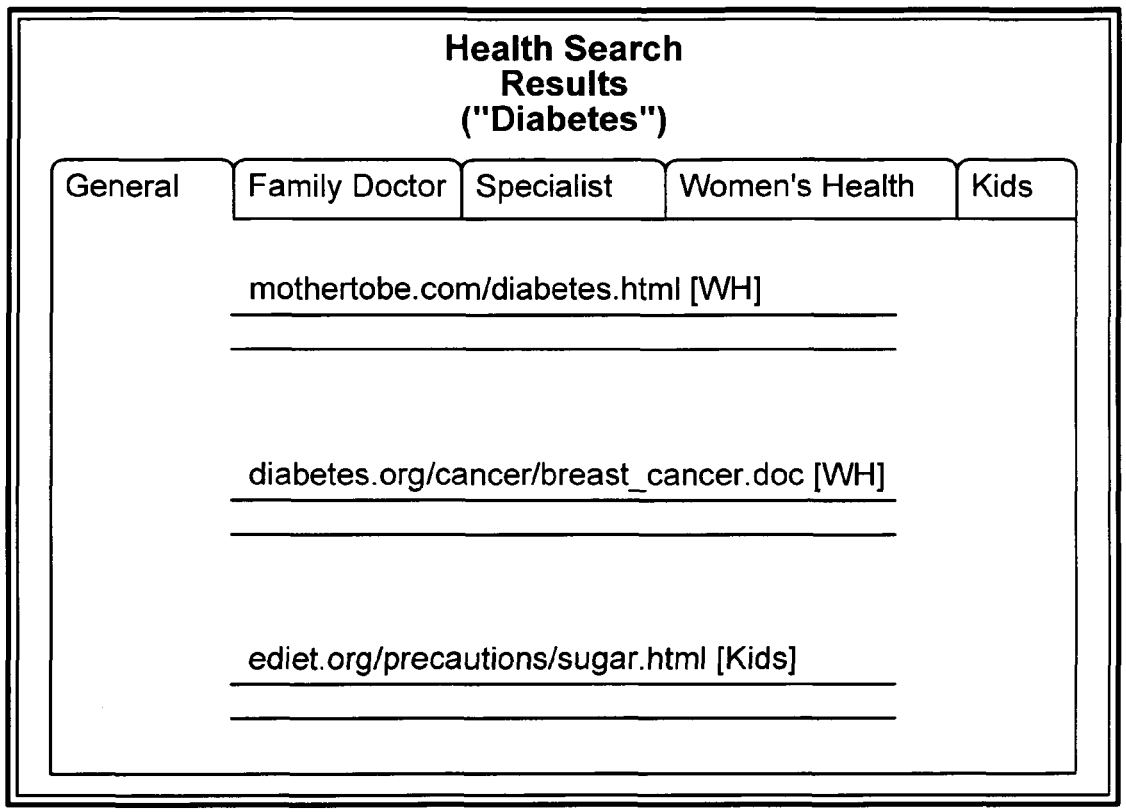
FIG. 6 illustrates an example of an embodiment of a display of search results.

FIG. 6 illustrates an example of an embodiment of a display of search results. The example shown in FIG. 6 could be an example of an implementation of portion 208 of FIG. 2. In the example shown, "diabetes" was determined to be most relevant to the health subcategories "Family Doctor," "Specialist," "Women's Health," and "Kids."

In this example, the "General" tab provides the user with results having the highest score across all categories. Links on the General tab include an indication of the category most relevant to the result. In the example shown, URLs 524, 526, and 522 had the highest total document goodness scores, respectively, and are presented as the top links under the General tab accordingly.

In some embodiments, General tab results are determined according to another scheme. For example, the General tab may include a handful of each of the top results from each of the other tabs instead of or in addition to other results.

Figure 7:
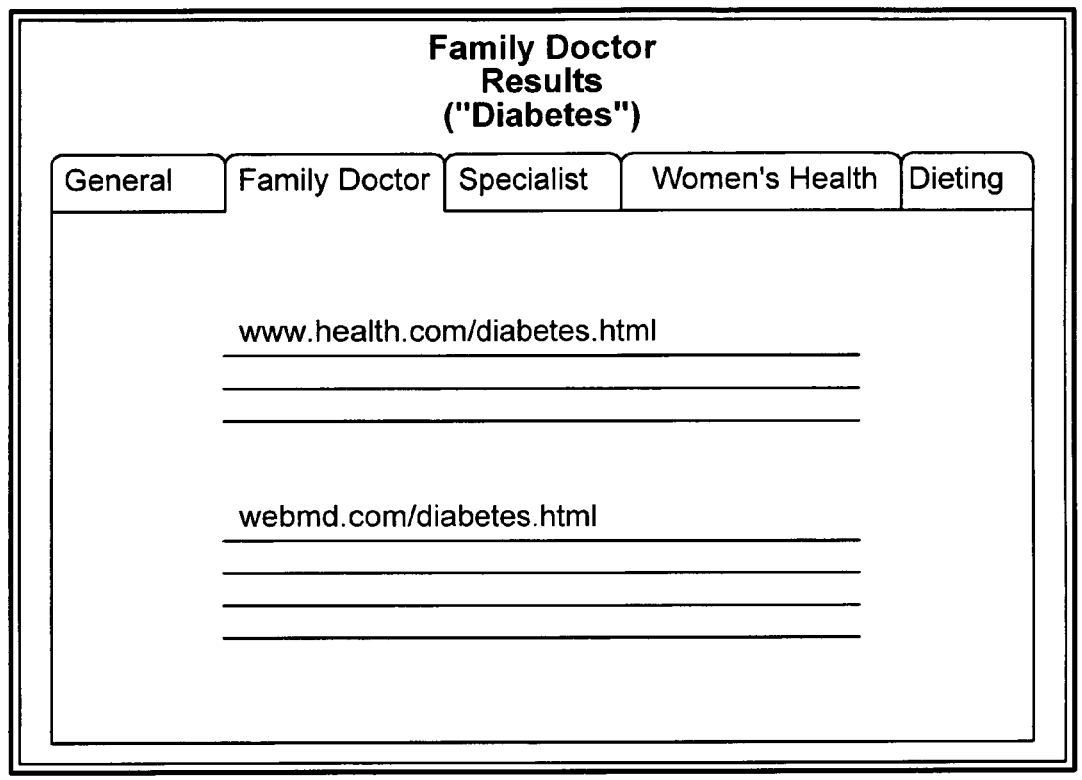
FIG. 7 illustrates an example of an embodiment of a display of search results.

FIG. 7 illustrates an example of an embodiment of a display of search results. In the example shown, a user has selected the Family Doctor tab of the results page shown in FIG. 6. The highest ranked pages relative to the Family Doctor topic are presented, accordingly. URLs 518 and 528 share the same relevance score relative to the Family Doctor topic. URL 518 has a higher text match score and is listed first. In other embodiments, other schemes may be used to break ties.

Figure 8:
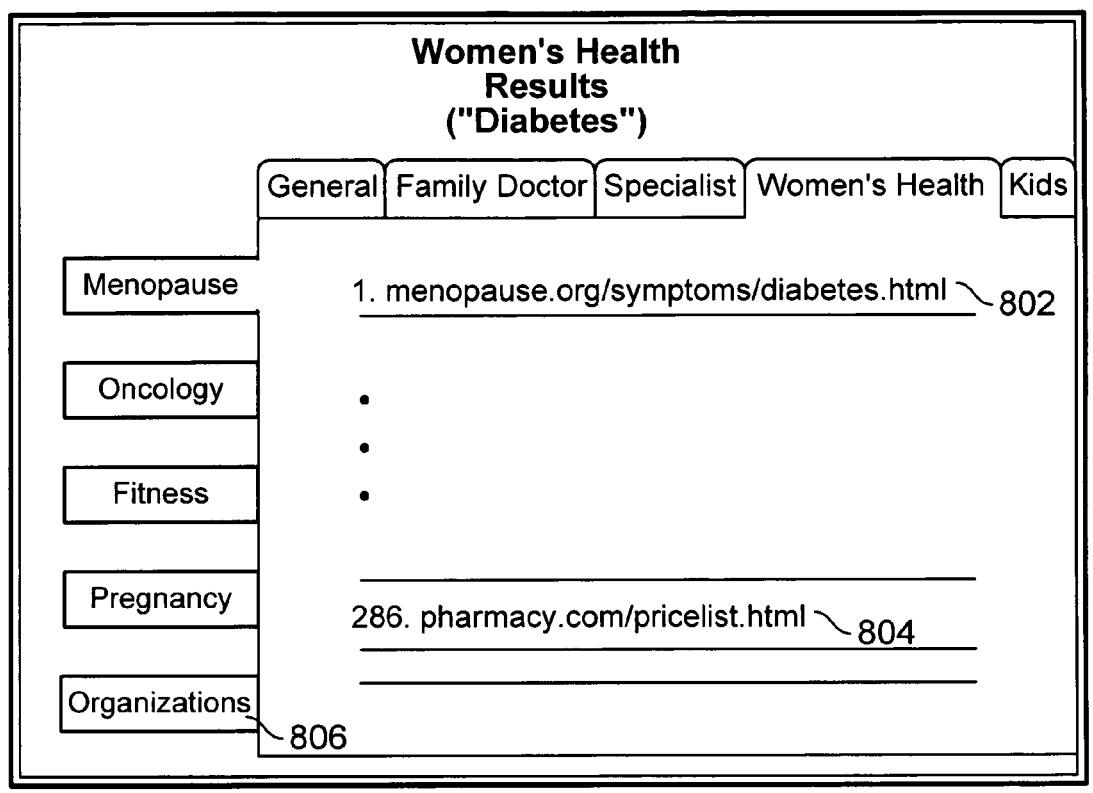
FIG. 8 illustrates an example of an embodiment of a display of search results.

FIG. 8 illustrates an example of an embodiment of a display of search results. In the example shown, a user has selected the Women's Health tab of the results page shown in FIG. 6. The Women's Health topic is further divided into subtopics. By selecting the Menopause subtopic within the women's health topic, the user is presented with the highest ranked pages having the highest relevance to the combined topics of diabetes and menopause. As shown, the highest ranking results provide the most relevant information on the intersection of the query and the intersection of the topics of women's health and menopause. In this example, result 802 describes how diabetes affects menopause symptoms. In lower ranking result 804, the terms "diabetes" and "menopause" both appear on a pharmaceutical price list but are independently discussed. By selecting the Organizations tab (806), the user is presented with a list of one or more organizations associated with the query. For example, for the term "diabetes", a user may be presented with links to groups such as the American Diabetes Association.

Figure 9:
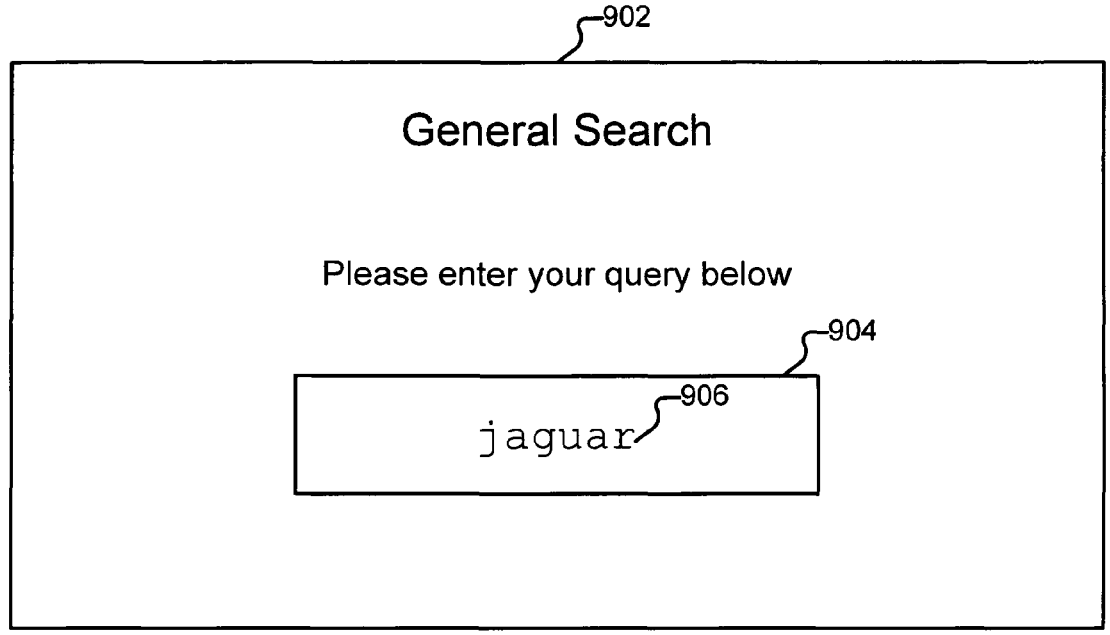
FIG. 9 illustrates an example of an embodiment of an interface for obtaining a query.

FIG. 9 illustrates an example of an embodiment of an interface for obtaining a query. The example shown in FIG. 9 could be an example of an implementation of portion 202 of FIG. 2. In this example, a web page 902 includes a form 904 into which a user can submit a query 906. Here, web page 902 provides general search capabilities, aimed at providing visitors the ability to search the entire web across all topics, rather than a topic-specific portal as depicted in FIG. 3. In the example shown, the user has entered a query of "jaguar" (906).

Figure 10A:
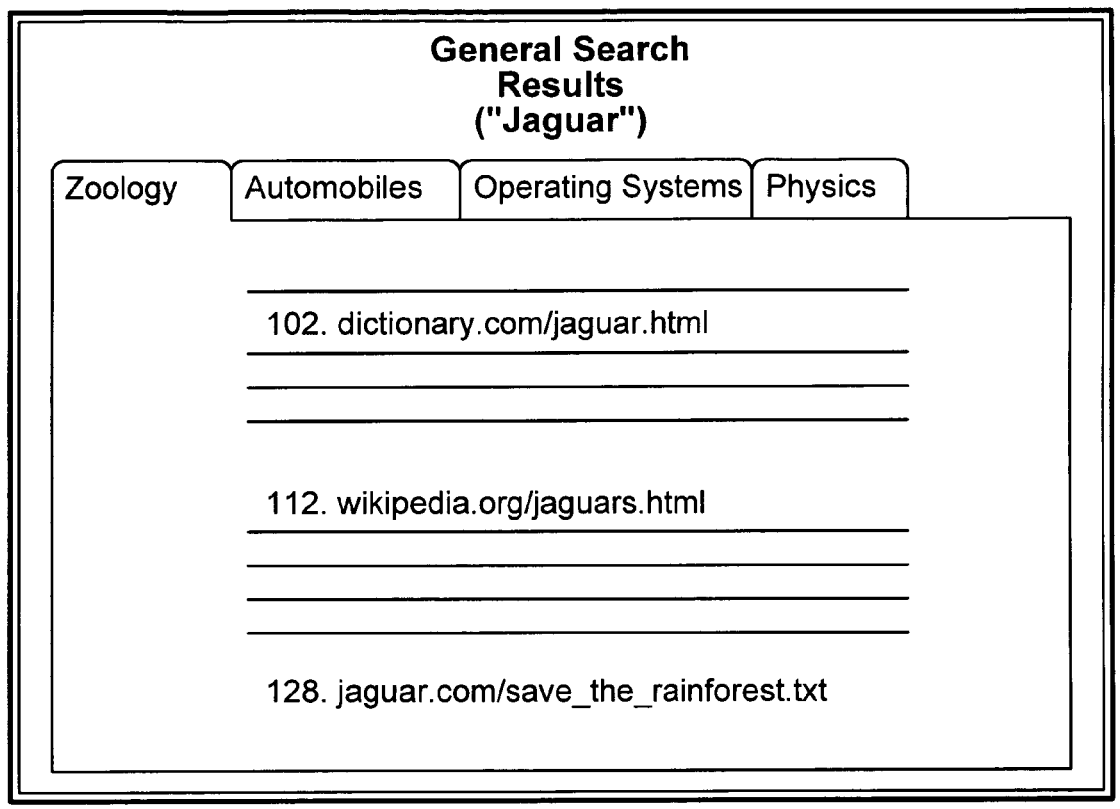
FIG. 10A illustrates an example of an embodiment of a display of search results.

FIG. 10A illustrates an example of an embodiment of a display of search results. The example shown in FIG. 10A could be an example of an implementation of portion 208 of FIG. 2. Search server 104, employing a matrix such as matrix 500, has determined that the topics most relevant to the query "jaguar" are Zoology, Automobiles, Operating Systems and Physics, respectively.

In the example shown, the first several results presented under the Zoology tab include URLs for zoos, large animal veterinarians, and so on. A link to a dictionary definition of "jaguar" is ranked 102nd. The dictionary definition is predominantly directed at describing the animal, but also mentions the automobile. Ranked 112th is an online encyclopedia entry that gives equal treatment to the animal, the automobile, the Jaguar operating system, and the physics book, "The Quark and the Jaguar." Ranked 128th is a page about jungle conservation efforts sponsored by the automobile manufacturer.

Figure 10B:
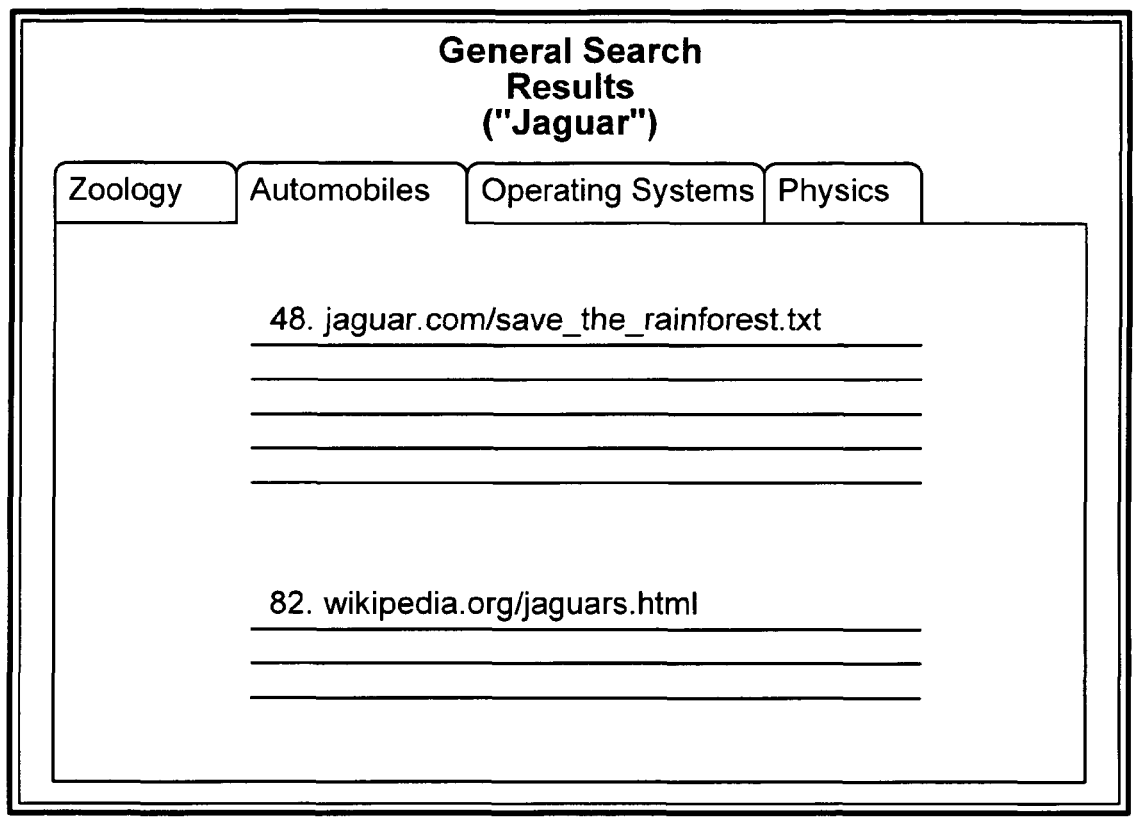
FIG. 10B illustrates an example of an embodiment of a display of search results.

FIG. 10B illustrates an example of an embodiment of a display of search results. In the example shown, the user has selected the Automobiles tab. The same results previously available under the Zoology tab are also available under the Automobiles tab. However, they are displayed in a different order. The results are now ranked based on their relevance relative to the topic of automobiles, rather than their relevance relative to the topic of zoology.

As shown in FIG. 10B, the conservation page sponsored by the automobile manufacturer is now ranked 48th. The encyclopedia article, having more information about the automobile than the dictionary definition, is ranked 82nd.

If the user clicked on the Operating Systems tab or the Physics tab, the encyclopedia article would likely appear higher in those results lists than the conservation page sponsored by the automobile manufacturer.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:
1. A method of delivering search results comprising:
obtaining a search term;
determining categories;
obtaining and ranking results specific to each category based on a criterion that is specific to each category; and
delivering at least one result based at least in part on a topic dependent score, and based at least in part on a topic independent score, wherein the topic dependent score and the topic independent score are associated with the same result, and wherein the topic independent score is based at least in part on the search term;

wherein the topic dependent score reflects a relevance of the result to a topic; and wherein at least a portion of the topic dependent score is determined prior to obtaining the search term.

2. The method of claim 1 wherein the categories are flavors.

3. The method of claim 2 wherein the flavors are based at least in part on a seed set.

4. The method of claim 3 wherein the seed set is dynamic.

5. The method of claim 1 wherein results are ranked based at least in part on a topic dependent score.

6. The method of claim 5 wherein the topic dependent score includes a double iterative flavor rank score.

7. The method of claim 5 wherein the topic dependent score includes a topic relevance score.

8. The method of claim 5 wherein the topic dependent score is a composite score.

9. The method of claim 1 wherein results are ranked based at least in part on a topic independent score.

10. The method of claim 1 wherein the order in which the results are presented is determined based at least in part on the relevance of the found pages to a category.

11. The method of claim 1 wherein the results are displayed in a tabbed format.

12. The method of claim 1 wherein the results are displayed in a topic hierarchy.

13. The method of claim 1 wherein the categories are subcategories of a single flavor.

14. The method of claim 1 wherein the categories are selected by an administrator.

15. The method of claim 1 wherein the categories are obtained from a directory service.

16. A system for delivering search results comprising:
a processor configured to:
obtain a search term;
determine categories; and
obtain and rank results specific to each category based on a criterion that is specific to each category; and
deliver at least one result based at least in part on a topic dependent score, and based at least in part on a topic independent score, wherein the topic dependent score and the topic independent score are associated with the same result, and wherein the topic independent score is based at least in part on the search term; and
a memory coupled with the processor, wherein the memory provides the processor with instructions;
wherein the topic dependent score reflects a relevance of the result to a topic; and
wherein at least a portion of the topic dependent score is determined prior to obtaining the search term.

17. The system of claim 16 wherein the processor is further configured to rank results based at least in part on a topic dependent score.

18. The system of claim 17 wherein the topic dependent score includes a double iterative flavor rank score.

19. The system of claim 17 wherein the topic dependent score includes a topic relevance score.

20. A computer program product for delivering search results, the computer program product being embodied in a computer readable storage medium and comprising computer instructions for:
obtaining a search term;
determining categories;
obtaining and ranking results specific to each category based on a criterion that is specific to each category; and
delivering at least one result based at least in part on a topic dependent score, and based at least in part on a topic independent score, wherein the topic dependent score and the topic independent score are associated with the same result, and wherein the topic independent score is based at least in part on the search term;
wherein the topic dependent score reflects a relevance of the result to a topic; and
wherein at least a portion of the topic dependent score is determined prior to obtaining the search term.

21. The computer program product of claim 20 wherein results are ranked based at least in part on a topic dependent score.

22. The computer program product of claim 21 wherein the topic dependent score includes a double iterative flavor rank score.

23. The computer program product of claim 21 wherein the topic dependent score includes a topic relevance score.

* * * * *